April 28, 1953 P. E. HAWKINSON 2,636,277
ADJUSTABLE MEASURING DEVICE FOR TIRES
Filed March 19, 1948 6 Sheets-Sheet 1

Inventor
Paul E. Hawkinson
By his Attorneys
Merchant & Merchant

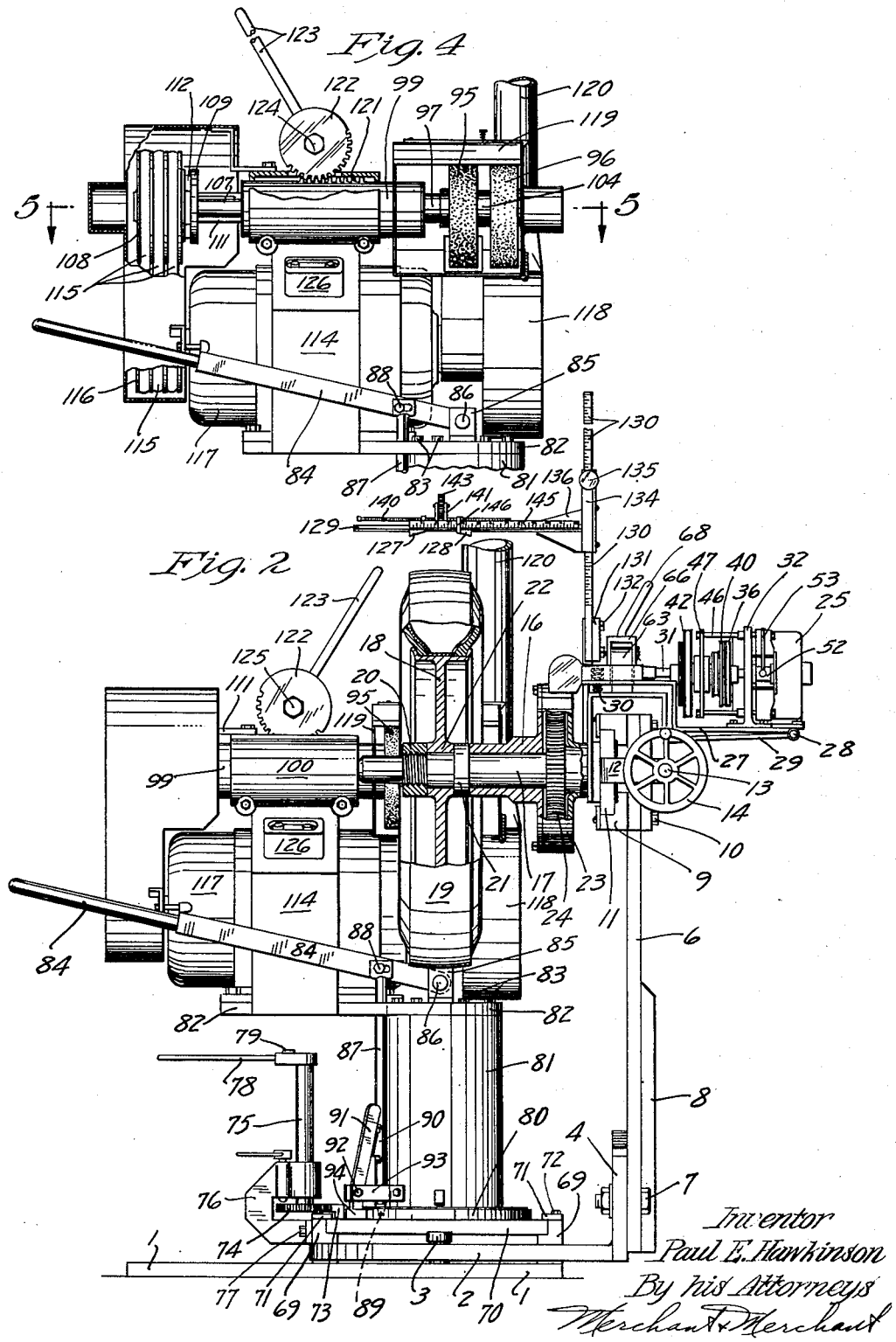

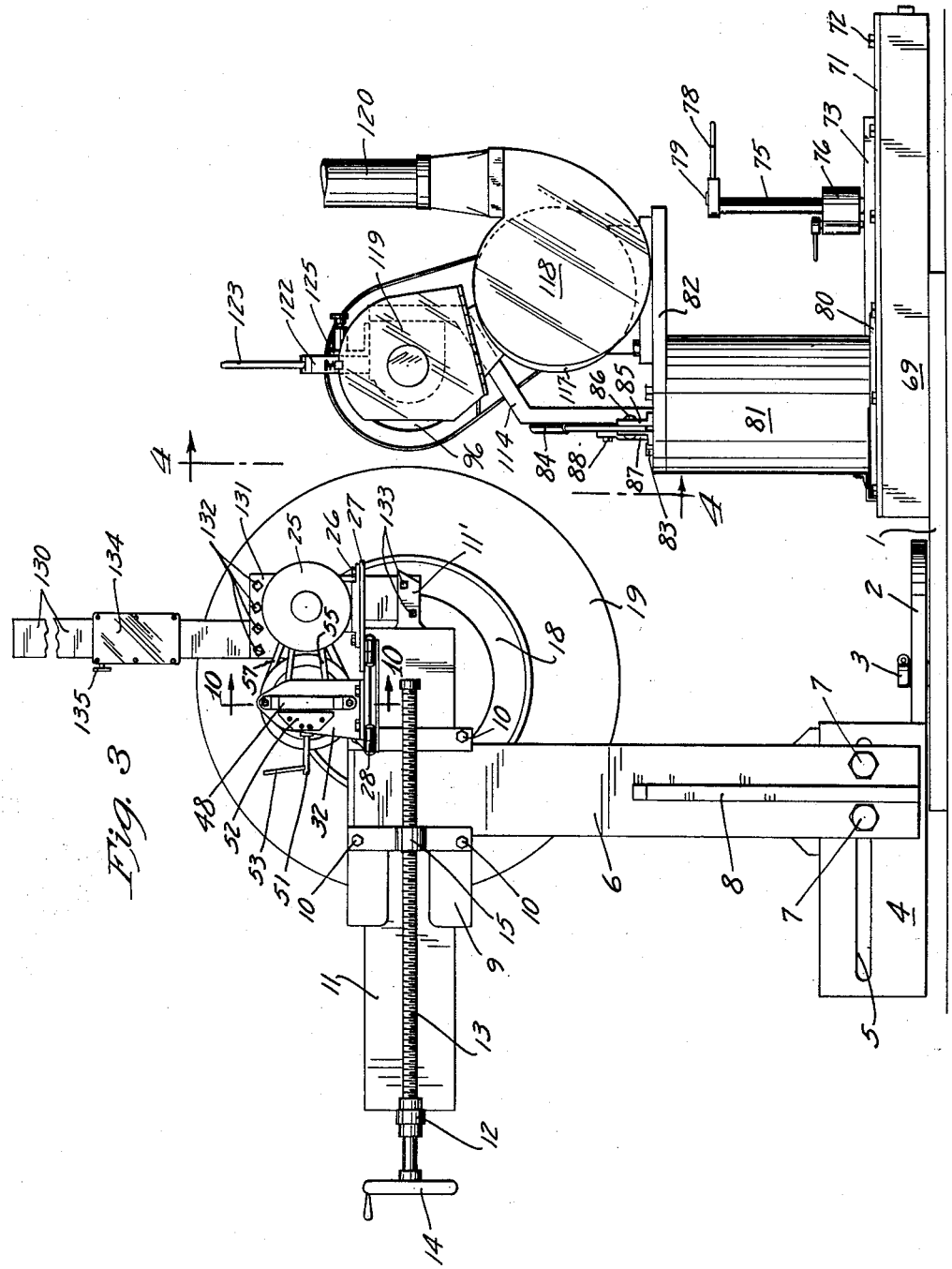

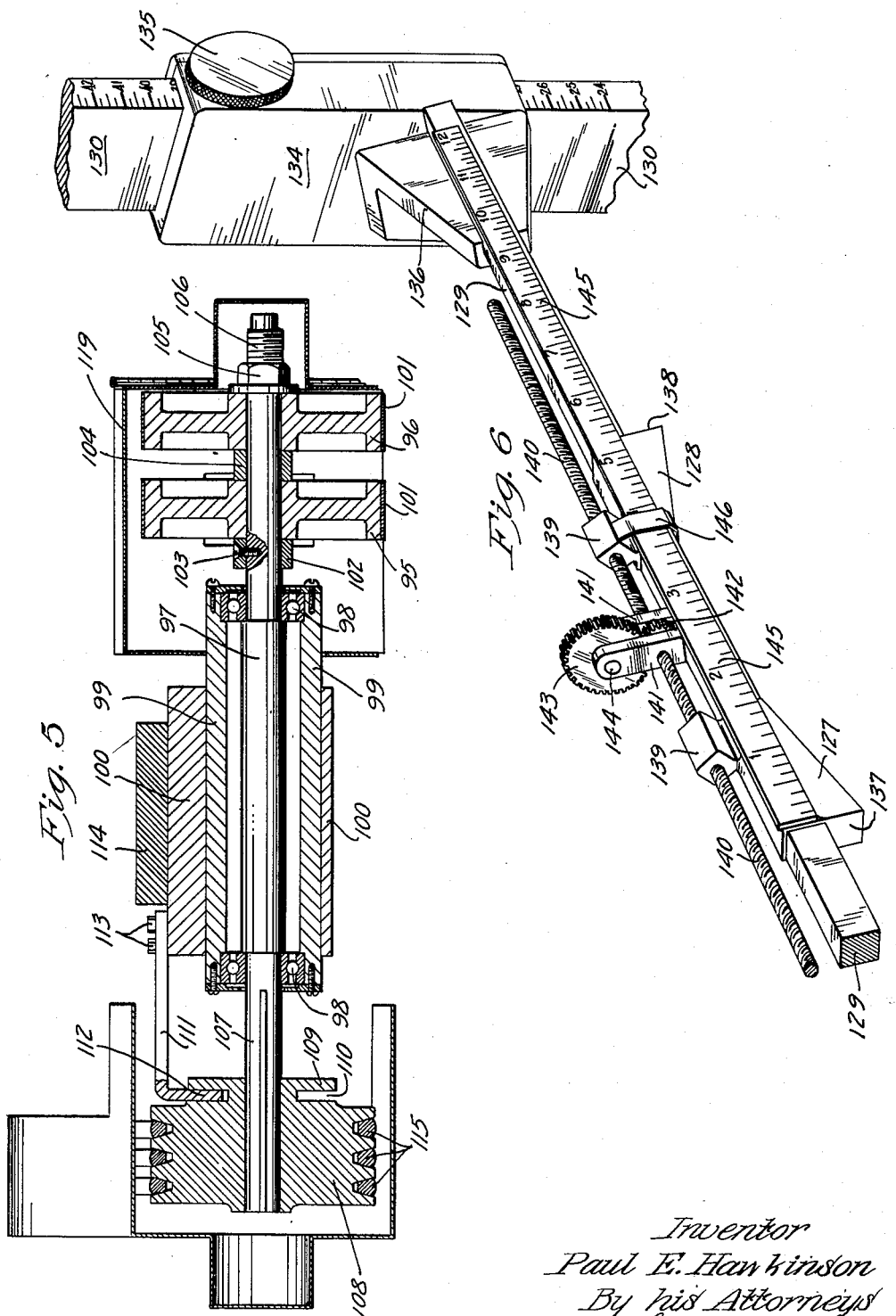

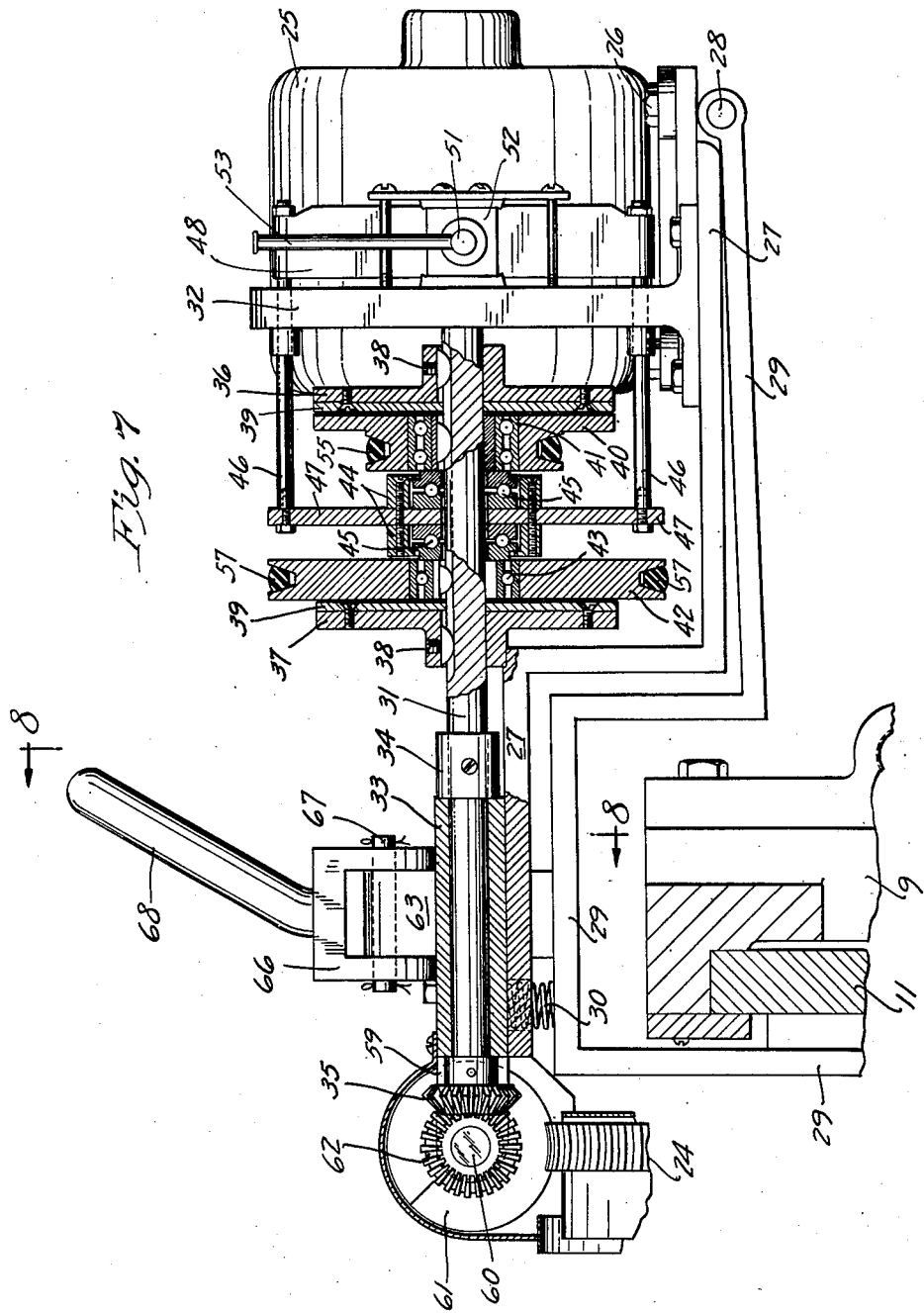

April 28, 1953  P. E. HAWKINSON  2,636,277
ADJUSTABLE MEASURING DEVICE FOR TIRES
Filed March 19, 1948  6 Sheets-Sheet 6
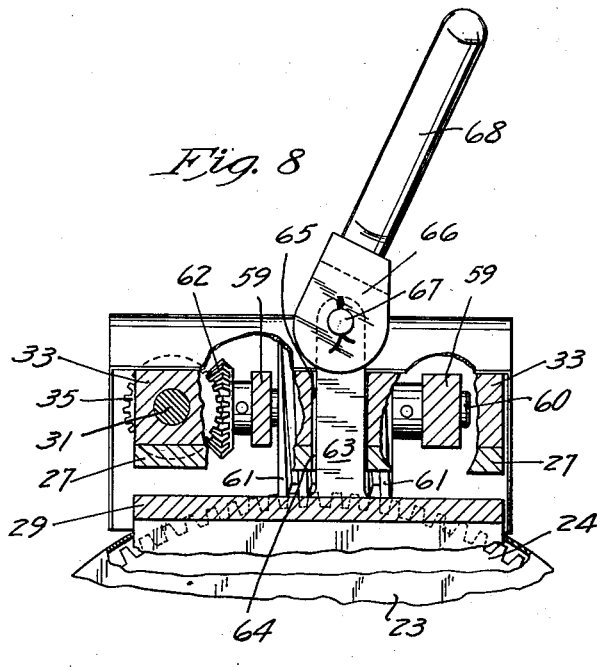
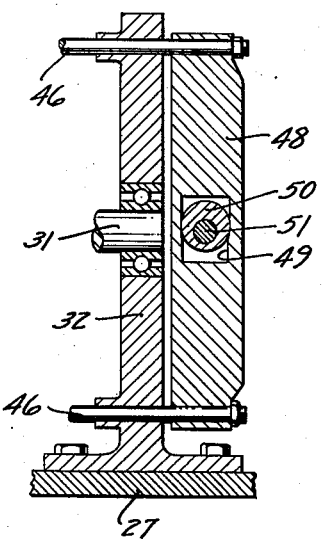
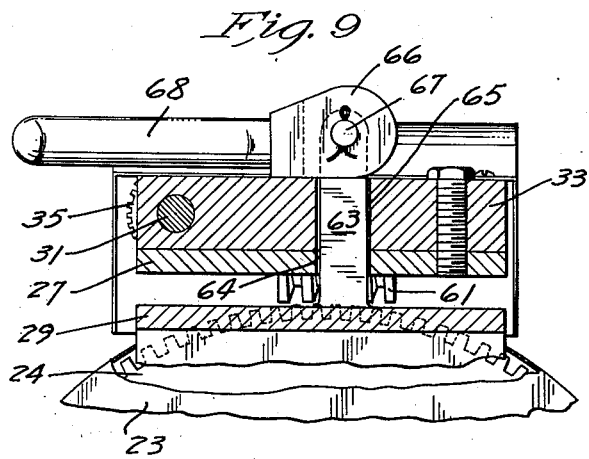
Inventor
Paul E. Hawkinson
By his Attorneys
Merchant & Merchant Patented Apr. 28, 1953

2,636,277

UNITED STATES PATENT OFFICE 2,636,277

ADJUSTABLE MEASURING DEVICE FOR TIRES

Paul E. Hawkinson, Minneapolis, Minn., assignor to Paul E. Hawkinson Company, Minneapolis, Minn., a corporation of Minnesota Application March 19, 1948, Serial No. 15,791

4 Claims. (Cl. 33—143)

My invention relates to a tire buffing or abrading machine and particularly to such a machine constructed and arranged to buff or finish a tire in connection with applying a new tread to a worn tire.

In the buffing of the periphery of a tire prior to the application thereto of the new tread material, it is important not only that the periphery be buffed on the desired arc but also that the periphery is buffed an equal distance from the lateral center line of the tire, that is, the center line between the side walls thereof. If the latter is not accomplished, there is always a tendency to place the new tread material more on one side than another with the result that the tire, when cured, is out of balance.

An important object of my invention is novel adjustable measuring and centering devices by which an operator may be guided in the buffing and trueing of the periphery of a tire and in the placing of the new tread stock thereon.

The above and still further objects of my invention will become apparent from the following detailed specification, appended claims, and attached drawings.

Referring to the drawings, wherein like characters indicate like parts throughout the several views:

Fig. 2 is a front elevation of the machine of Fig. 1, some parts broken away and some parts shown in section;

Fig. 3 is a view in side elevation of my novel buffing machine, some parts being broken away;

Fig. 4 is a fragmentary view in front elevation, some parts broken away, shown as being taken on the line 4—4 of Fig. 3;

Fig. 5 is an enlarged sectional detail, taken on the line 5—5 of Fig. 4;

Fig. 6 is a greatly enlarged fragmentary detail in perspective of the tire tread width indicator of my invention;

Fig. 7 is an enlarged fragmentary detail, some parts shown in section, taken on the line 7—7 of Fig. 1;

Fig. 8 is a detail in section, taken on the line 8—8 of Fig. 7, some parts being broken away;

Fig. 9 is a view corresponding substantially to Fig. 8 but showing a different position of some of the parts; and Fig. 10 is an enlarged fragmentary detail taken on the line 10—10 of Fig. 3.

Figure 1:
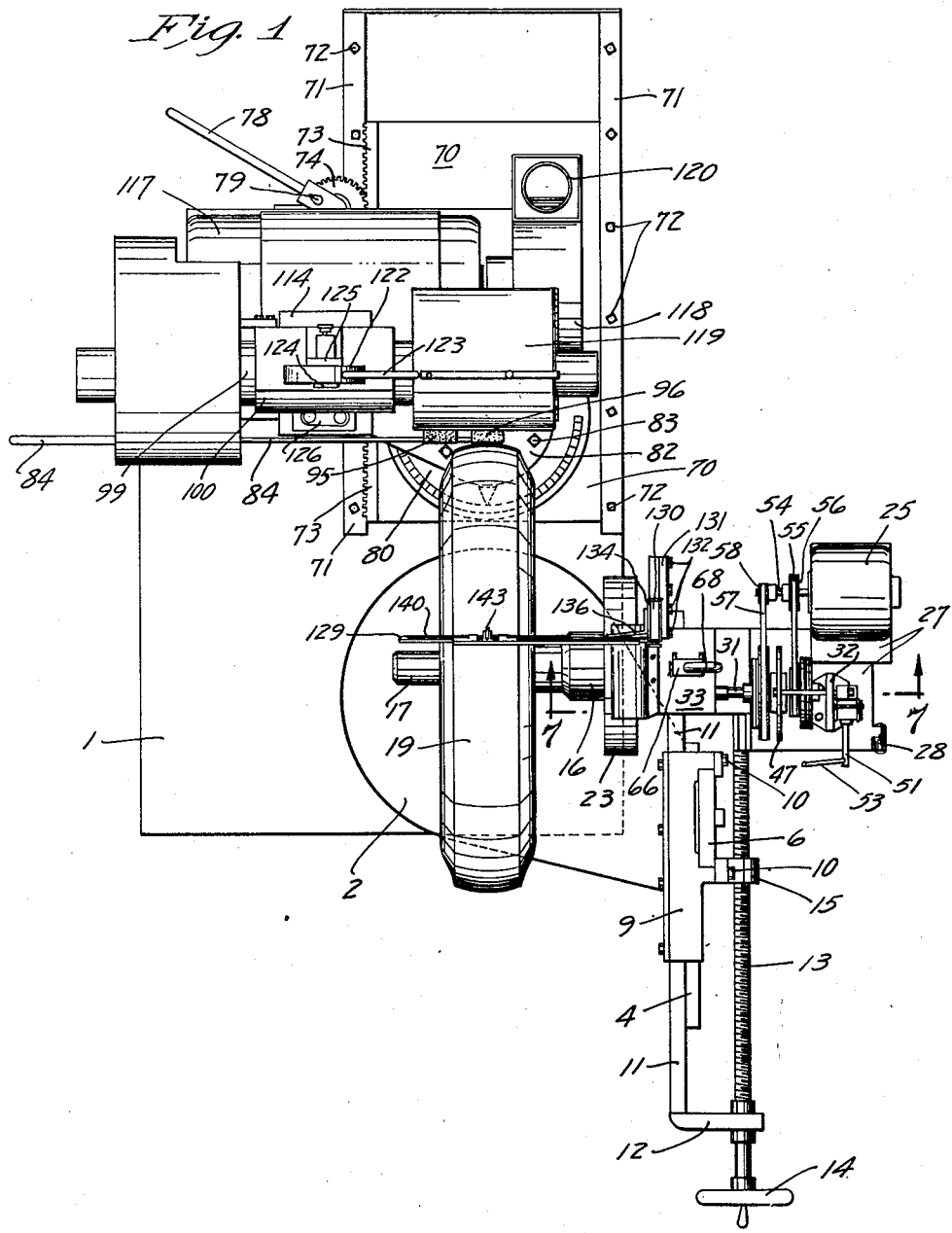
Fig. 1 is a view in plan of my novel buffing machine.

Referring with greater particularity to the drawings, a machine is shown comprising a base 1, preferably and as shown in the form of a plate. Plate 1, at one end thereof, has a turntable 2 mounted on a vertical axis through the medium of stud shaft 3. Turntable 2 is of circular form for most of its extent but has one side projecting somewhat with a rectilinear edge, and a bracket 4 is secured to said turntable at said side by welding or the like. Bracket 4 has an elongated horizontally-extended slot 5, and a standard 6 has a flat side engaging the outer face of the bracket 4 and is connected to said bracket by a pair of headed bolts 7 passing through slot 5. Standard 6 is of rectangular form in horizontal cross-section and has a vertically-extending strengthening rib 8 at its outer side. Suitable rollers or bearings not shown may be interposed between the turntable 2 and the base 1 to prevent binding therebetween. Mounted on the standard 6 is a cross head or block 9. Block 9 is movable on the standard 6 and can be held in various fixed positions thereon by screws 10. A slide 11 fits in a groove in one side of the block 9 and is movable therein in a direction at right angles to the standard 6. The slide 11 has an arm 12 projecting from one side; and a screw 13 passes through said arm, said screw being provided with an operating hand wheel 14. A screw 13 passes through a threaded projection 15 of the cross head 9, which acts as a nut. The screw 13 is connected to the arm 12 so that rotation of the hand wheel 14 and screw 13 moves slide 11 transversely of the head 9. The parts so far described, including the turntable 2 and the parts carried thereby, are substantially the same as shown in applicant's prior Patent No. 2,392,667.

A spindle casing 16 is secured by welding or the like to one end portion of the slide 11 and projects laterally outwardly therefrom. Journalled in the casing 16 is a shaft 17 which extends laterally outwardly from the casing 16 and is adapted to support a wheel 18 upon which is mounted in a conventional manner a tire casing 19. Outwardly of the wheel 18, the shaft 17 is threaded to receive a locking nut 20. The shaft 17 is provided with an integrally-formed stop collar 21 against which the hub 22 of the wheel 18 is adapted to be forced by tightening of the nut 20. Adjacent the slide 11, the casing 16 is enlarged to form a gear housing portion 23 which encompasses a worm gear 24 mounted fast on the shaft 17.

The worm gear 24, and consequently the wheel 18 and tire 19, have rotary movements imparted thereto from a motor 25 through the medium of a multiple speed clutch and gearing now to be described. The motor 25 is secured by machine bolts or the like 26 to a base plate 27 which is, in turn, hingedly mounted at its outer end, as indicated at 28, to a bracket 29. The bracket 29 extends over the cross head 9 and is secured by welding or the like to the inner face of the slide 11. It will be seen, particularly by reference to Fig. 7, that the base 27 overlies the bracket 29 for the greater part of its length and is biased in a direction away from the bracket 29 by means of a coil compression spring 30. A drive shaft 31 is journalled at its opposite ends in bearing brackets 32 and 33 secured to opposite end portions of the base plate 27 and is held against axial movements relative to said brackets in one direction by means of a collar 34 and in the other direction by the hub of a beveled gear 35. Opposed clutch disks or flanges 36 and 37 are secured fast in axially-spaced relation on the shaft 31 between the brackets 32 and 33 by means of key and set screw fastenings 38 and are provided with friction linings 39 adjacent the clutch flange 36. Adapted to have clutching engagement therewith is a flange-equipped V-pulley 40 which is journalled on an anti-friction bearing 41 slidably mounted on the shaft 31. A V-pulley 42 is journalled on an anti-friction bearing 43 slidably carried by the shaft 31 and has one side thereof adapted to come into frictional engagement with the friction element 39 of the clutch flange 37. It will be seen by reference to Fig. 7 that the pulley 42 is of considerably greater diameter than the V-pulley 40 for a purpose which will hereinafter become apparent. A shifter collar 44 is interposed between the V-pulleys 40 and 42 and is provided with anti-friction thrust bearings 45 on either side thereof. Shifter collar 44 is stationary with respect to the rotation of the shaft but is mounted for axial movements with respect thereto by means of a plurality of shifter rods 46 which are secured at the radially-projecting outer ends 47 of the collar 44 and which project through and are slidably carried by the bracket 32 (see particularly Figs. 7 and 10). The extreme outer or projected ends of the rods 46 are secured fast in opposite ends of a shifter head 48. The shifter head 48 is slotted intermediate its ends, as indicated at 49 (see particularly Fig. 10), and is shifted laterally by means of an eccentric 50 which lies within and engages the sides of the slot 49. The eccentric 50 is mounted fast on a stub shaft 51, which is journalled in a bearing 52 mounted fast on the bracket 32. The outer end of the stub shaft 51 is provided with a shifter lever 53. As shown in Fig. 7, when the shifter lever is in a vertical position, both of the clutches 36 and 37 are out of engagement with their respective pulleys 40 and 42. It will be noted that movement of the shifter lever 53 to the right or to the left with respect to Fig. 7 will cause the clutch-engaging face of one or the other of the pulleys 40 or 42 to come into driving engagement with its respective clutch flange 36 or 37. The pulleys 40 and 42 are coupled for driving engagement to the motor shaft 54 by means of a V-belt 55 running over the pulley 40 and a V-pulley 56 on the motor shaft 54, and by a V-belt 57 running over the V-pulley 42 and a V-pulley 58 on the extreme outer end of the motor shaft 54. It will be seen by reference to Figs. 1 and 7 that the pulley 40 is of considerably less diameter than the pulley 42 and that the pulley 56 on the motor shaft 54 is of greater diameter than the V-pulley 58. With this in mind, it should be seen that, when the pulley 40 is engaged with its respective clutch 36, the speed of rotation of the shaft 31 is much greater than when the pulley 42 is engaged with its respective clutch member 37.

The bearing bracket 33 is provided with bearing bosses 59 which journal a worm shaft 60 on which is keyed or otherwise secured a worm 61. The worm 61 is located between the bearing bosses 59 and is adapted to have driving engagement with the worm gear 24. A beveled pinion 62, fast on one end of the shaft 60, has meshing engagement with the beveled gear 35 on the shaft 31, whereby to rotate the worm 61.

It is often desirable to disconnect or to uncouple the rotary shaft 17 from driving engagement with the motor 25 so that the tire 19 may be turned manually for inspection purposes and the like. For this reason, I provide the hinge arrangement 28 between the motor base plate 27 and the bracket 29 and bias said base away from said bracket by means of the spring 30. When the outer or free end of the base plate 27 is free for movement, bias of the spring 30 will raise the free end of the base plate 27 and the parts carried thereby to a point where the worm 61 is out of meshing engagement with the worm gear 24. Means for lowering the free end of the base plate 27 against bias of the spring 30 comprises an upstanding lug 63 fast on the bracket 29 projecting through aligned openings 64 and 65 in the base plate 27 and bearing bracket 33 respectively; and a cam 66 journalled to the upper end of the lugs 63, as indicated at 67. As shown in Fig. 8, the cam 66 is bifurcated to straddle the lug 63 and engage the top of the bearing bracket 33. An operating handle 68 projects outwardly from one end of the cam 66 and, together with the cam 66, is moved to a position as shown in Figs. 7 and 8, whereby the worm 61 is in meshing engagement with the worm gear 24. When the operating handle 68 is moved to the position of Fig. 9, the bias of the spring 30 moves the worm 61 out of engagement with the worm gear 24 as shown.

The base 1 is provided at one end with a pair of spaced parallel guide bars 69 which are rectangularly notched to support a slide 70. The slide 70 is held in place by bars 71 which are secured to the guide bars 69 by means of bolts or the like 72. The slide 70 is adapted for movements toward and from the turntable 2, and mechanism for moving the same comprises a rack 73 fast on the slide 70 and a pinion 74 on one end of a pinion shaft 75 journalled in a bearing bracket 76, which is bolted or otherwise secured to one of the guide bars 69, as indicated at 77. The upper end of the shaft 75 is provided with a ratchet lever 78, which is of the conventional type having a pawl 79 which can be set to have the ratchet in neutral or right and left operative positions, so that the pinion 74 will be moved by swinging the lever 78 in one direction or the other to move the slide 70 toward or away from the turntable 2.

Mounted fast on the slide 70 is a circular base plate 80 which rotatively supports a pedestal 81 projecting upwardly therefrom and concentric therewith. A platform 82 is secured to the upper end of the pedestal 81 by headed bolts or the like 83. A turning lever 84 for the pedestal 81 is pivotally secured to brackets 85, as indicated at 86, said brackets being secured to the platform 82 directly over the pedestal 81. An index rod 87 is loosely connected at its upper end by bolt and slot connections 88 to the intermediate portion of the turning handle 84 and projects downwardly through an opening in the platform 82 adjacent the pedestal 81. The lower end of the index rod 87 is adapted to be received into an indexing aperture in the circular base plate 80, said aperture being shown by dotted lines in Fig. 2 and indicated by the numeral 89. Intermediate its ends, the index rod 87 is provided with a cam-acting lug 90 which is adapted to engage one end of a brake lever 91 which is pivoted as at 92 to a bracket 93 rigidly secured to the side of the pedestal 81. At its extreme lower end, the brake lever 91 is provided with a friction lug 94 that is engageable with the outer peripheral surface of the stationary circular base plate 80. The turning lever 84 is shown in Figs. 2 and 4 as being disposed in its lower position with the lower end of the index rod 87 seated in the aperture 89 of the base plate 80. Limited upward movement of the lever 84 will disengage the index rod 87 from the aperture 89 and permit turning of the pedestal 81 and parts carried thereby relative to the base plate 80. Continued upward movement of the lever 84 will cause the cam-acting lug 90 to engage the upper end of the brake lever 91 and cause the friction lug 94 to engage the outer peripheral surface of the base plate 80 so that the pedestal may be effectively locked in any desired position for a purpose which will hereinafter become apparent.

For the buffing of the crown of the tire 19 preparatory to application of new tread rubber thereto, I provide a pair of buffing or abrading wheels 95 and 96 mounted fast in axially-spaced relation on one end of a rotary shaft 97. The shaft 97 is journalled by means of anti-friction bearings 98 in a bearing sleeve 99, which is slidably mounted in a housing 100 (see particularly Figs. 4 and 5). The buffing wheels 95 and 96 are covered with suitable abrasive material 101 which may be coarse in nature, as indicated on the wheel 95 in Fig. 4, or relatively fine, as indicated on the wheel 96 in Fig. 4. Referring particularly to Fig. 5, it will be seen that the buffing wheels 95 and 96 are held against endwise movement on the shaft 97 in one direction by a stop collar 102 secured thereto by means of a set screw or the like 103. A spacing collar 104 is interposed between the buffing wheels 95 and 96 to maintain the same in spaced relation, and a washer-equipped nut 105 screw-threaded on the extreme outer threaded end 106 of the shaft 97 securely clamps the buffing wheels 95 and 96 and spacing collar 104 therebetween and the collar 102. Opposite the buffing wheels 95 and 96, the rotary shaft 97 is extended beyond the bearing sleeve 99, as indicated at 107, and has mounted thereon for rotation therewith, but for axial sliding movements with respect thereto, a V-pulley 108. The V-pulley 108 is provided with a flange 109 which provides a circumferential channel 110. A bracket 111 has an inturned end 112 projected into the channel 110 and its opposite end rigidly secured to the housing 100 by means of machine screws or the like 113. This arrangement maintains the V-pulley 108 at a predetermined spaced relation to the end of the housing 100 irrespective of the position of the axial movable bearing sleeve 99 with respect thereto. The housing 100 and all elements carried thereby are supported from the platform 82 by means of a rigid bracket 114, the lower portion of which is secured by welding or the like to the platform 82 and the upper end portion of which is offset and secured by any suitable means to the housing 100. The buffing wheels 95 and 96 are driven by V-belts 115 running over the V-pulley 108 and another V-pulley 116 fast on the shaft of a motor 117. The motor 117, is mounted on the platform 82 directly behind the bracket 114 and in addition to driving the buffing wheels 95 and 96, operates an exhaust fan not shown but contained within a fan housing 118. The fan draws material buffed from the tire through a hood 119 partially enclosing the buffing wheels 95 and 96 and blows the same through an exhaust stack 120 to a suitable place of disposal, not shown.

It will be seen, by reference to Figs. 1 and 2, that the tire 19 lies in a vertical plane extending through the centers of pivotal movement of the turntable 2 and the pedestal 81. The positioning of the bearing sleeve 99 in the housing 100, that of the buffing wheels 95 and 96 on the shaft 97, and the spacing between the buffing wheels, is such that one or the other of the wheels 95 or 96 may be selectively moved into or out of the vertical plane of the centers of pivotal movement of the turntable 2 and the pedestal 81. Means for imparting axial movements to the bearing sleeve 99 and parts carried thereby includes a gear rack 122 on the bearing sleeve 99, a toothed gear segment 122 having meshing engagement with the gear rack 121, and a shifter handle 123 on the gear segment 122. The gear segment 122 is pivoted as at 124 to a bracket 125 rigidly secured to the top of the housing 100 (see particularly Figs. 1–4 inclusive). In Figs. 1 and 2, the bearing sleeve 99 is positioned to bring the buffing wheel 96 into the vertical plane of the centers of pivotal movement of the turntable 2 and pedestal 81, and in Figs. 4 and 5, the bearing sleeve 99 is moved to the other extreme position, whereby to bring the buffing wheel 95 into the vertical plane of the centers of pivotal movement of the turntable 2 and pedestal 81. A switch for controlling the motor 117 is mounted on the bracket 114 and is indicated by the numeral 126.

I provide an adjustable measuring and centering device comprising a pair of gauge elements 127 and 128 independently slidably mounted on a horizontally-disposed guide arm 129. The guide arm 129 is adapted to be supported from the slide 11 by means of a vertically-extended post 130 secured at its lower end to a bracket 131 by screws or the like 132. The bracket 131 is secured to an arm 11' projecting longitudinally from one end of the slide 11 by bolts or the like 133 (see particularly Figs. 1, 2, and 3). An adjustable head 134 is mounted for vertical movements on the post 130 and may be located in any desired position thereon by means of a thumb screw 135. An angle bracket 136 rigidly connects the guide arm 129 to the head 134 so as to position the guide arm 129 above and parallel to the axis of the shaft 17. The gauge elements 127 and 128 are formed to provide gauge-acting surfaces 137 and 138 respectively on their outer ends. On their upper sides, the gauge elements 127 and 128 are provided with nut-acting heads 139 which are reversely threaded, one with a right hand thread and the other with a left hand thread, to receive the reversely threaded portions of a stud 140. The stud 140 is journalled intermediate its ends in a pair of spaced bearing lugs 141 secured fast to the guide arm 129. The spur pinion 142 is rigidly secured to the stud 140 intermediate the lugs 141 and has meshing engagement with a spur gear 143 that is mounted for rotation between the lugs 141 on a short shaft 144. The intermeshing gears 142 and 143 lie in a vertical plane extending through the pivot axes of the turntable 2 and pedestal 81, and gauges 127 and 128 are so spaced from one another that the gauge acting surfaces 138 thereon are equidistant at all times from said vertical plane. It will be understood that the wheel 18 upon which a tire 19 of a given size is mounted, is so constructed that when the shaft 17 is at right angles to the vertical plane extending through the pivot axes of the turntable 2 and pedestal 81, said vertical plane will be located centrally of the side walls of the tire 19 irrespective of the size of the tire. The numeral 145 indicates a scale having indicia in inches and fractions thereof and is secured at one end by welding or the like to the gauge element 127. Scale 145 extends through and is slidably supported by the guide element 128 through the medium of a guide bracket 146 secured at its lower end to the element 128 and at its upper end to the nut-acting head 139 thereof. Manipulation of the gear 143 will cause the gauge elements 127 and 128 to move simultaneously toward or away from one another and the distances between the opposite gauge-acting surfaces 128 will register on the scale 145. It will be seen by reference to Figs. 2 and 6 that the post 130 is also provided with a scale marked in inches and fractions thereof, whereby a direct reading of the diameter of a tire may be had simply by moving the adjustable head 134 and parts carried thereby to a point where the gauge elements 127 and 128 engage the crown of the tire 19.

When it is desired to apply new tread rubber of a predetermined width to the tire 19, it is often desirable to remove some of the material from the side edges of the crown thereof. Gauge elements 127 and 128 are moved to the desired setting and the side edges of the crown portion of the tire buffed in accordance with the setting of the gauge elements. The relative positions of the tires and buffing wheels for this operation are clearly shown in my prior Patent No. 2,392,667 (Fig. 2), and it is assumed that detailed description thereof is unnecessary. However, while the buffing wheel engages the tire 19, said tire is rotated at a predetermined speed by the motor 25 and gearing associated therewith. This speed is, of course, much slower than the peripheral speed of the buffing wheels. If a tire is required to be buffed to a certain diameter, said diameter can be very easily read on the markings of the scale on the post 130. Buffing the crown surface of the tire 19 is accomplished in exactly the same manner as set forth in my prior Patents 2,254,526 and 2,392,667. The crown surface of the tire is preferably buffed to provide a relatively rough surface for an efficient adhesion of the new tread rubber thereto. For this purpose, the buffing wheel 95 is moved to its operative position wherein it lies in the vertical plane extending between the pivot axes of the turntable 2 and the pedestal 81 and laterally centrally of the tire 19. When buffing the side edges of the crown portion of the tire 19, the bearing sleeve 99 is moved so as to bring the buffing wheel 96 into said vertical plane. The buffing wheel 96, having a relatively fine grinding surface, will impart a relatively smooth surface to the side edges of the crown of the tire 19. When buffing the crown surface of the tire 19, abrading surfaces 101 of the buffing wheels are maintained in position to have face to face engagement with the tire by alignment and seating of the index rod 87 in the aperture 89, under extreme downward movement of the lever 84. When the side edges of the crown portion of the tire are being buffed, the pedestal 81 and buffing mechanism carried thereby are frictionally locked against rotation by engagement of the friction lug 94 with the peripheral surface of the base plate 80 under extreme upward movement of the lever 84.

The gauge elements 127 and 128 also serve as centering guides when new tread rubber or "camelback" is applied to the buffed crown of the tire. The camelback may be applied while the tire 19 is being power-rotated at a relatively low speed, said speed obtained by moving the shifter lever 53 to the left with respect to Fig. 7 so as to cause frictional engagement between the V-pulley 42 and clutch flange 37. The tire 19 may be power-rotated at either a relatively high or relatively low speed during the buffing operation, depending on the nature of the work, and this is determined by the position of the shifter lever 53 and parts associated therewith.

This machine has been thoroughly tested and demonstrated in actual practice and has been found to be completely adequate for the accomplishment of the objectives set forth; and, while I have disclosed a preferred embodiment of the invention, it should be obvious that the same is capable of various modifications without departure from the scope and spirit of the invention as defined in the claims.

What I claim is:

1. Means for gauging the axial limits of a circumferential tread area of a tire casing to be operated upon and for indicating the diameter of such area upon completion of operation thereon and wherein said casing is rotatably supported on a horizontal axle mounted on a support; said means comprising a vertically disposed post having its lower end connected to said support and having a tire tread diameter indicating scale thereon, a gauge head vertically adjustably supported on said post, a horizontally disposed tread area gauge arm extending over the tire tread and having one end thereof secured to said gauge head, a pair of gauge elements slidably supported on said arm and having opposed gauging faces equidistantly spaced from the central vertical plane of the tire casing, and means supported on the arm and operatively engaged with said gauge elements for simultaneous movement thereof toward and away from said plane.

2. The structure according to claim 1 wherein said last means comprises a pair of spaced lugs projecting upwardly from said arm intermediate said gauge elements, an elongated rod having oppositely arranged threads and cooperating with nut-acting heads on said gauge elements, said rod extending through aligned apertures in said lugs, a pinion secured to said rod and disposed between said lugs and a finger rotatable gear journaled in said lugs in operative engagement with said pinion.

3. The structure according to claim 1, wherein said gauge elements have bottom faces converging upwardly toward said vertical plane for general conformity with the casing tread upon lowering of said arm for ascertaining the diameter of the tread as indicated by the scale on said post in cooperation with the gauge head.

4. The structure according to claim 1, together with an elongated scale bar having one end thereof secured to one of said gauge elements, and a guide bracket secured to the other gauge element through which said scale bar extends for relative movement thereto.

PAUL E. HAWKINSON.

References Cited in the file of this patent

UNITED STATES PATENTS

| Number | Name | Date |
|---|---|---|
| 563,944 | Thiem | July 14, 1896 |
| 1,245,213 | Gammeter | Nov. 6, 1917 |
| 1,281,526 | Curtis | Oct. 15, 1918 |
| 1,363,825 | Taylor | Dec. 28, 1920 |
| 1,420,700 | Hoffman | June 27, 1922 |
| 1,576,453 | Nordstrom | Mar. 9, 1926 |
| 1,977,297 | Weaver | Oct. 16, 1934 |
| 2,040,449 | Stevens | May 12, 1936 |
| 2,045,778 | Huntley et al. | June 30, 1936 |
| 2,149,409 | Van Norman | Mar. 7, 1939 |
| 2,242,031 | Hjarpe | May 13, 1941 |
| 2,271,130 | Pearson | Jan. 27, 1942 |
| 2,392,667 | Hawkinson | Jan. 8, 1946 |

FOREIGN PATENTS

| Number | Country | Date |
|---|---|---|
| 241,226 | Switzerland | July 10, 1946 |
| 499,684 | Germany | Nov. 27, 1930 |
| 677,564 | France | Dec. 18, 1929 |
| 815,392 | France | Apr. 12, 1937 |